United States Patent
Zhang et al.

(10) Patent No.: US 7,809,194 B2
(45) Date of Patent: Oct. 5, 2010

(54) CODED VISUAL MARKERS FOR TRACKING AND CAMERA CALIBRATION IN MOBILE COMPUTING SYSTEMS

(75) Inventors: Xiang Zhang, Lawrenceville, NJ (US); Nassir Navab, Plainsboro, NJ (US)

(73) Assignee: Siemens Corporation, Iselin, NJ (US)

( * ) Notice: Subject to any disclaimer, the term of this patent is extended or adjusted under 35 U.S.C. 154(b) by 910 days.

(21) Appl. No.: 11/704,137

(22) Filed: Feb. 8, 2007

(65) Prior Publication Data

US 2007/0133841 A1   Jun. 14, 2007

Related U.S. Application Data

(62) Division of application No. 10/262,693, filed on Oct. 2, 2002, now abandoned.

(60) Provisional application No. 60/326,960, filed on Oct. 4, 2001.

(51) Int. Cl.
  *G06K 9/00* (2006.01)
(52) U.S. Cl. ..................... 382/181
(58) Field of Classification Search ............ 382/103, 382/181
  See application file for complete search history.

(56) References Cited

U.S. PATENT DOCUMENTS

| 5,856,844 A * | 1/1999 | Batterman et al. ..... 348/207.99 |
| 6,782,119 B1 * | 8/2004 | Barlett ..................... 382/113 |
| 7,526,122 B2 * | 4/2009 | Usuda et al. ............. 382/159 |

* cited by examiner

*Primary Examiner*—Tom Y Lu
(74) *Attorney, Agent, or Firm*—Donald B. Paschburg; F. Chau & Associates, LLC

(57) ABSTRACT

A method for determining a pose of a user is provided including the steps of capturing a video image sequence of an environment including at least one coded marker; detecting if the coded marker is present in the video images; if the marker is present, extracting feature correspondences of the coded marker; determining a code of the coded marker using the feature correspondences; and comparing the determined code with a database of predetermined codes to determine the pose of the user. According to an embodiment, the coded marker includes four color blocks arranged in a square formation and the determining a code of the at least one marker further includes determining a color of each of the four blocks. According to another embodiment, the marker includes a coding matrix and a code of the marker being determined by numbered squares of the coding matrix being covered by a circle.

12 Claims, 6 Drawing Sheets drdr1 rgbd2 dddd3

0000c (000000000000)

4895b (111111111111)

1365a (010101010101)

CODED VISUAL MARKERS FOR TRACKING AND CAMERA CALIBRATION IN MOBILE COMPUTING SYSTEMS

PRIORITY

This is a divisional application of an application entitled "CODED VISUAL MARKERS FOR TRACKING AND CAMERA CALIBRATION IN MOBILE COMPUTING SYSTEMS" filed in the United States Patent and Trademark Office on Oct. 2, 2002 now abandoned and assigned Ser. No. 10/262,693, which claims priority to an application entitled "DESIGN CODED VISUAL MARKERS FOR TRACKING AND CAMERA CALIBRATION IN MOBILE COMPUTING SYSTEMS" filed in the United States Patent and Trademark Office on Oct. 4, 2001 and assigned Ser. No. 60/326,960, the contents of which are hereby incorporated by reference.

BACKGROUND OF THE INVENTION

1. Field of the Invention

The present invention relates generally to computer vision systems, and more particularly, to a system and method for tracking and camera calibration in a mobile computing system using coded visual markers.

2. Description of the Related Art

In certain real-time mobile computing applications, it is crucial to precisely track the motion and obtain the pose (i.e., position and orientation) of a user in real-time, also known as localization. There are several methods currently available to carry out the localization. For example, in augmented reality (AR) applications, magnetic or/and inertia trackers have been employed. However, it is not unusual that the performance of magnetic and inertia trackers are limited by their own characteristics. For example, the magnetic trackers are affected by the interference of nearby metal structures and the currently available inertia trackers can only be used to obtain information on orientation and are usually not very accurate in tracking very slow rotations. Additionally, infrared trackers have been employed but these devices usually require the whole working area or environment to be densely covered with infrared sources or reflectors, thus making them not suitable for a very large working environment.

Vision-based tracking methods have been used with limited success in many applications for motion tracking and camera calibration. Ideally, people should be able to track the motion or locate an object of interest based only on the natural features of captured scenes, i.e., viewed scenes, of the environment. Despite the dramatic progress of computer hardware in the last decade and a large effort to develop adequate tracking methods, there is still not a versatile vision-based tracking method available. Therefore, in controlled environments, such as large industrial sites, marker-based tracking is the preferred method of choice.

Current developments of computer vision-based applications are making use of the latest advances in computer hardware and information technology (IT). One such development is to combine mobile computing and augmented reality technology to develop systems for localization and navigation guidance, data navigation, maintenance assistance, and system reconstruction in an industrial site. In these applications, a user is equipped with a mobile computer. In order to guide the user to navigate through the complex industrial site, a camera is attached to the mobile computer to track and locate the user in real-time via a marker-based tracking system. The localization information then can be used for database access and to produce immersive AR views.

To be used for real-time motion tracking and camera calibration in the applications described above, the markers of a marker-based tracking system need to have the following characteristics: (1) sufficient number of codes available for identification of distinct markers; (2) methods available for marker detection and decoding in real-time; and (3) robust detection and decoding under varying illumination conditions, which ensures the applicability of the marker in various environments.

SUMMARY OF THE INVENTION

According to one aspect of the present invention, a method for determining a pose of a user is provided including the steps of capturing a video image sequence of an environment including at least one coded marker; detecting if the at least one coded marker is present in the video images; if the at least one marker is present, extracting feature correspondences of the at least one coded marker; determining a code of the at least one coded marker using the feature correspondences; and comparing the determined code with a database of pre-determined codes to determine the pose of the user.

According to another aspect of the present invention, the at least one coded marker includes four color blocks arranged in a square formation and the determining a code of the at least one marker further includes determining a color of each of the four blocks.

According to a further aspect of the present invention, the detecting step further includes applying a watershed transformation to the at least one coded marker to extract a plurality of closed-edge strings that form a contour of the at least one marker.

According to another aspect of the present invention, the at least one marker includes a coding matrix including a plurality of columns and rows with a numbered square at intersections of the columns and rows, the coding matrix being surrounded by a rectangular frame and a code of the at least one marker being determined by the numbered squares being covered by a circle. The coding matrix includes m columns and n rows, where m and n are whole number, resulting in $3 \times 2^{m \times n - 4}$.

According to a further aspect of the present invention, a system is provided including a plurality of coded markers located throughout an environment, each of the plurality of coded markers relating to a location in the environment, codes of the plurality of coded markers being stored in a database; a camera for capturing a video image sequence of the environment, the camera coupled to a processor; and the processor adapted for detecting if at least one coded marker is present in the video images, if the at least one marker is present, extracting feature correspondences of the at least one coded marker, determining a code of the at least one coded marker using the feature correspondences, and comparing the determined code with the database to determine the pose of the user. In one embodiment, the at least one coded marker includes four color blocks arranged in a square formation and a code of the at least one marker being determined by a color sequence of the blocks. In another embodiment, the at least one marker includes a coding matrix including a plurality of columns and rows with a numbered square at intersections of the columns and rows, the coding matrix being surrounded by a rectangular frame and a code of the at least one marker being determined by the numbered squares being covered by a circle.

In a further aspect, the camera and processor are mobile devices.

In another aspect, the system further includes a display device, wherein the display device will provide to the user information relative to the location of the at least one marker. Additionally, wherein based on a first location of the at least one marker, the display device will provide to the user information to direct the user to a second location.

In yet another aspect, the system further includes an external database of information relative to a plurality of items located throughout the environment, wherein when the user is in close proximity to at least one of the plurality of items, the processor provides the user with access to the external database. Furthermore, the system includes a display device for displaying information of the external database to the user and for displaying virtual objects overlaid on the at least one item.

In a further aspect, the system includes a head-mounted display for overlaying information of the at least one item in a view of the user.

BRIEF DESCRIPTION OF THE DRAWINGS

The above and other objects, features, and advantages of the present invention will become more apparent in light of the following detailed description when taken in conjunction with the accompanying drawings in which.

DETAILED DESCRIPTION OF PREFERRED EMBODIMENTS

Preferred embodiments of the present invention will be described herein below with reference to the accompanying drawings. In the following description, well-known functions or constructions are not described in detail to avoid obscuring the invention in unnecessary detail.

The present invention is directed to coded visual markers for tracking and camera calibration in mobile computing systems, systems employing the coded visual markers and methods for detecting and decoding the markers when in use. According to one embodiment of the present invention, color coded visual markers are employed in systems for tracking a user and assisting the user in navigating a site or interacting with a piece of equipment. In another embodiment, black and white matrix coded visual markers are utilized.

Generally, the marker-based tracking system of the present invention includes a plurality of markers placed throughout a workspace or environment of a user. Each of the markers are associated with a code or label and the code is associated with either a location of the marker or an item the marker is attached to. The user directs a camera, coupled to a processor, to one or more of the markers. The camera captures an image of the marker or markers and determines the code of the markers. It then uses the codes to extract information about the location of the markers or about items in the close proximity to the markers.

Figure 1:
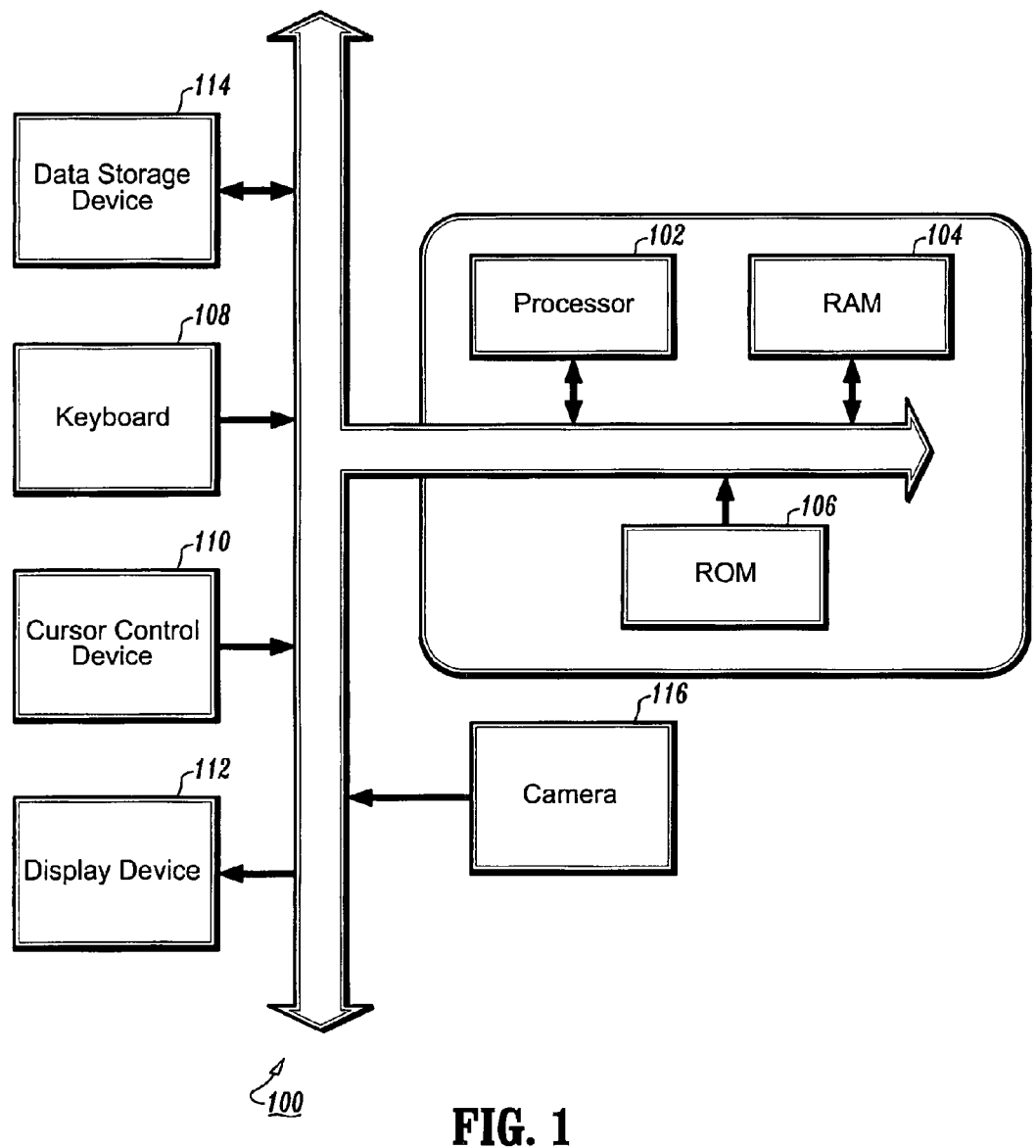
FIG. 1 is a block diagram of a system for tracking a user according to an embodiment of the present invention.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture such as that shown in FIG. 1. Preferably, the machine 100 is implemented on a computer platform having hardware such as one or more central processing units (CPU) 102, a random access memory (RAM) 104, a read only memory (ROM) 106, input/output (I/O) interface(s) such as keyboard 108, cursor control device (e.g., a mouse) 110, display device 112 and camera 116 for capturing video images. The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device 114 and a printing device. Preferably, the machine 100 is embodied in a mobile device such as a laptop computer, notebook computer, personal digital assistant (PDA), etc.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 2A:
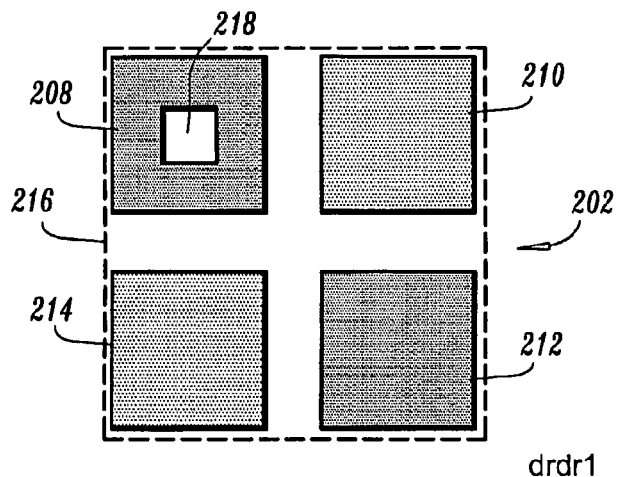
FIGS. 2(A) through 2(C) are several views of color coded visual markers used for tracking a user in an environment according to an embodiment of the present invention.
Figure 2B:
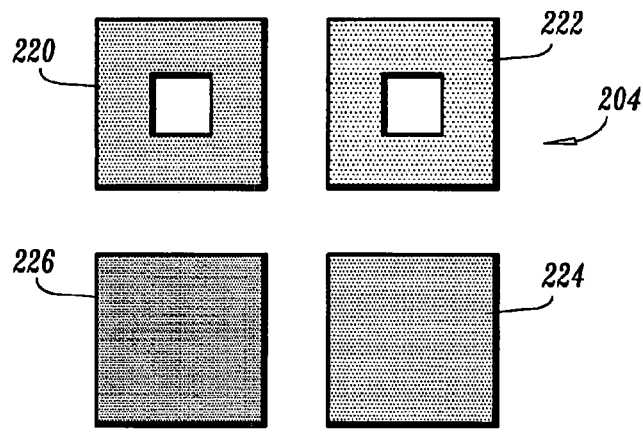
Figure 2C:
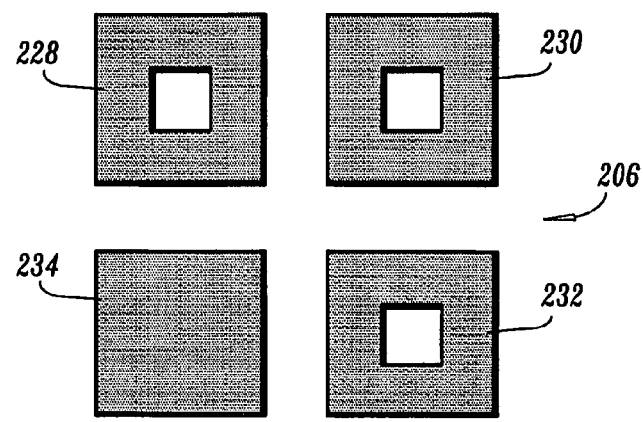

FIGS. 2(A) through 2(C) are several views of color coded visual markers used for tracking a user in an environment according to an embodiment of the present invention. The color based markers work well for relatively simple cases under friendly illuminative conditions. Each of these markers 202, 204, 206 includes four square blocks of either black or color. To simplify the marker detection and color classification, the color of the color blocks is limited to be one of the three primitive colors (i.e., red, green, and blue).

Referring to FIG. 2(A), the four blocks 208, 210, 212, 214 are centered at the four corners points of an invisible square 216, shown as a dashed line in FIG. 2(A). To determine the orientation of a marker, at least one and at most three of the four blocks of a marker are white patched 218. If there are two white patched blocks in one marker, the two blocks are preferably next to each other (not in diagonal) to ensure that there will be no confusion in determining the orientation.

The marker 202 is coded by the colors of the four blocks 208, 210, 212, 214 and the number of white patched blocks. For marker coding, the color coded visual markers use 'r' for red, 'g' for green, 'b' for blue, and 'd' for black. The order of the code is clockwise from the first white centered block 208, which is the block at the upper-left, and will include a letter for each color of the representative block. (Note, the lower-left block is preferably not white patched and at most the marker will include three white patched blocks). The number at the end of the code is the number of white patched blocks of the corresponding marker. For example, the marker shown in FIG. 2(A) is coded as drdr1 (block 208 is black, block 210 is red, block 212 is black and block 214 is red), the marker shown in FIG. 2(b) is coded as rgbd2 (block 220 is red, block 222 is green, block 224 is blue and block 226 is black), and the marker shown in FIG. 2(C) is coded as dddd3 (blocks 228, 230, 232 and 234 are all black). Therefore, a color coded marker system according to an embodiment of the present invention can have $3\times4^4=768$ different color markers.

Figure 3:
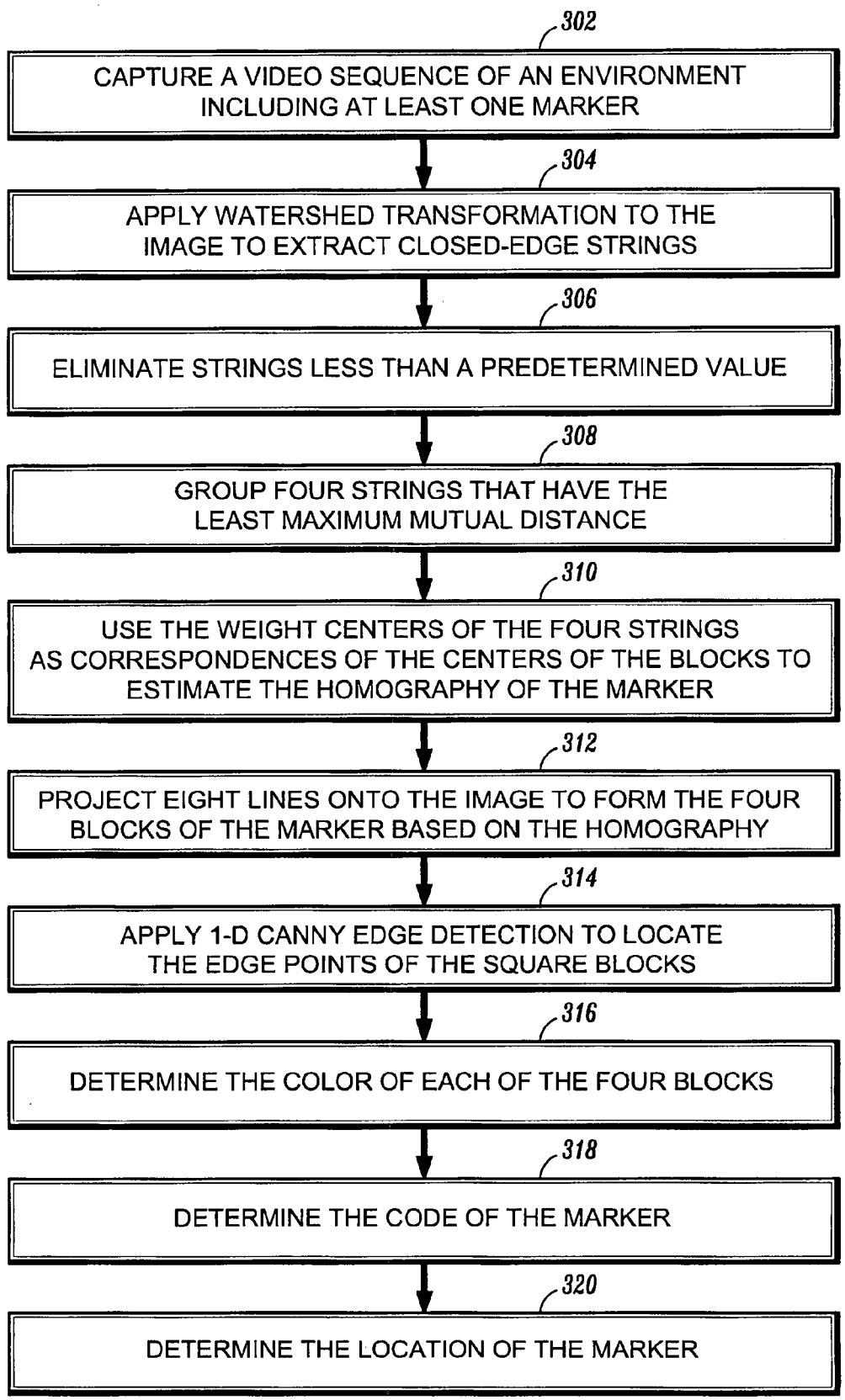
FIG. 3 is a flowchart illustrating a method for detecting and decoding the color coded visual markers of FIG. 2.

With reference to FIG. 3, a method for detecting and decoding a color coded visual marker of an embodiment of the present invention will be described.

Initially, a user equipped with a mobile computer having a camera coupled to the computer will enter a workspace or environment that has the color coded markers placed throughout. A video sequence of the environment including at least one marker will be captured (step 302) to acquire an image of the marker. A watershed transformation is applied to the image to extract closed-edge strings that form the contours of the marker (step 304). Since the markers are using the three primitive colors for marker coding, the watershed transformation need be applied to the two color components from RGB with the lower intensities to extract the color blocks.

Figure 4:
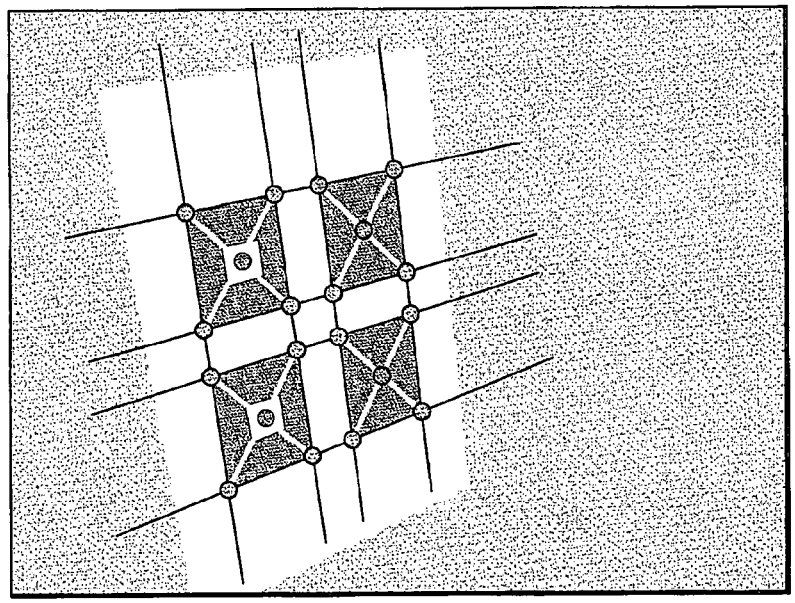
FIG. 4 is an image of a marker showing feature correspondences and lines projected onto the image to determine edges of the four blocks of the color coded visual marker.

In step 306, strings which are less than a predetermined value for representing a square block in a marker are eliminated. Then, the closed-edge strings are grouped based on the similarity of their lengths. The four strings that have the least maximum mutual distance will be put in one group (step 308). The maximum mutual distance among a group of N closed-edge strings is defined as follows:

$$d_{max} := \max(S(d_{i,j})) \quad (1)$$

where, $1\leq i\leq N$, $1\leq j\leq N$, and $i\neq j$, $d_{i,j}$ is the distance between the weight center of string i and the weight center of string j; S represent the set of $d_{i,j}$ for all eligible i and j. The four weight centers of the strings in each group are used as correspondences of the centers of the four blocks of a marker to compute a first estimation of a homography from the marker model plane to the image plane (step 310). The homography is used to project eight straight lines to form the four blocks of the marker as shown in FIG. 4 (step 312). These back projected lines are then used as an initialization to fit straight lines on the image plane. The cross points of these straight lines are taken as the first estimation of the correspondences of the corner points of the marker.

Along the first estimated edges, a 1-D Canny edge detection method, as is known in the art, (in the direction perpendicular to the first estimated edges) is used to locate accurately the edge points of the square blocks (step 314). Then, the eight straight lines fitted from these accurate edge points are used to extract the feature correspondences, i.e., corner points, of the marker with sub-pixel accuracy. Once the corner points of the marker are extracted along with the edge points of the square blocks, the blocks of the marker can be defined and each block can be analyzed for its color.

To determine the color of the blocks of the marker (step 316), the average values of the red, green, and blue component (denoted as R, G, and B) of all the pixels inside the block (the white patch area excluded) are measured. Then, the intensity I, hue H, and saturation S of the averaged block color is computed as follows:

$$I = R + G + B)/3 \quad (2)$$

$$S = 1.0 - 3.0 * \frac{\min(R, G, B)}{R + G + B}$$

$$H = \cos^{-1}\left\{\frac{0.5[(R-G)-(R-B)]}{\sqrt{(R-G^2)+(R-B)(G-B)}}\right\}$$

The color of the corresponding square block is then determined by the values of I, H, and S as follows: if $I \leq I_{thr}$, the color is black; else, if $S \leq S_{thr}$, the color is still black; else, if $0 \leq H < 2\pi/3$, the color is red; if $2\pi/3 \leq H < 4\pi/3$, the color is green; if $4\pi/3 \leq H < 2\pi$, the color is blue. Here, $I_{thr}$ and $S_{thr}$ are user adjustable thresholds.

Once the color of each block of a marker is determined, the code for the marker is derived as described above (step 318), for example, drdr1. Once the code has been determined, the code can be matched against a database of codes, where the database will have information related to the code (step 320) and the pose of the marker can be determined. For example, the information may include a location of the marker, a type of a piece of equipment the marker is attached to, etc.

By applying these color coded visual markers in real-time tracking and pose estimation fast real-time marker detection and extraction of correspondences can be achieved. The color coded visual markers provide up to 16 accurate correspondences available for calibration. Additionally, by taking the cross points of the color block, the correspondences of the four center points of the blocks can be located with higher accuracy, where four points provides the least correspondences for computing the homography resulting in faster processing.

Figure 5A:
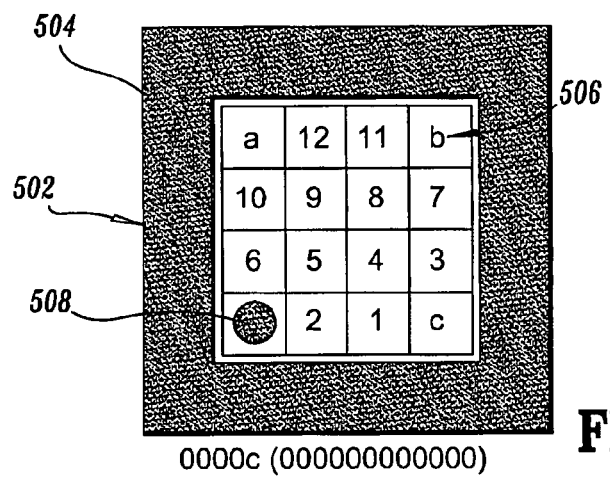
FIGS. 5(A) through 5(C) are several views of black/white matrix coded visual markers used for tracking a user in an environment according to another embodiment of the present invention.
Figure 5B:
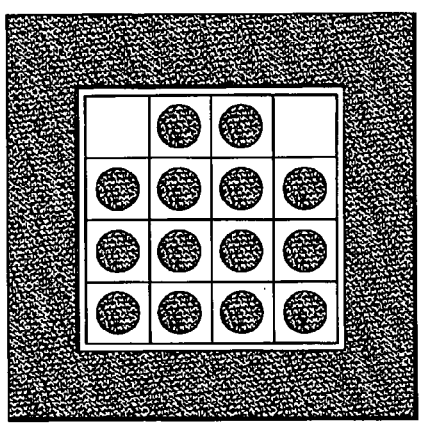
Figure 5C:
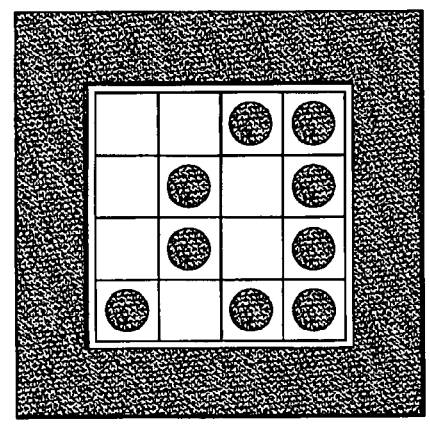

FIGS. 5(A) through 5(C) are several views of matrix coded visual markers used for tracking a user in an environment according to another embodiment of the present invention. Using the black/white matrix coded markers can avoid the problems caused by instability of color classification under unfriendly lighting conditions.

Referring to FIG. 5(a), a black/white matrix coded marker 502 is formed by a thick rectangular frame 504 and a coding matrix 506 formed by a pattern of small black circles 508 distributed inside the inner rectangular of the marker. For example, the markers shown in FIGS. 5(A)-(C) are coded with a 4×4 coding matrix.

The marker 502 with a 4×4 coding matrix is coded using a 12-bit binary number with each bit correspond to a numbered position in the coding matrix as shown in FIG. 5(A). The 4 corner positions labeled 'a', 'b', 'c', and 'd' in the coding matrix are reserved for a determination of marker orientation. If the corresponding numbered position is covered by a small black circle, then the corresponding numbered bit of the 12-bit binary number is 1, otherwise it is 0. The marker is thus labeled by the decimal value of the 12-bit binary number.

To indicate uniquely the orientation of marker 502, the position labeled a is always white, i.e., a=0, while the position labeled d is always covered by a black circle, d=1. In addition, in the case that b is black, then c has to be also black. A letter is added to the end of the marker label to indicate one of the three combinations: a for (a=0, b=1, c=1, d=1), b for (a=0, b=0, c=1, d=1), and c for (a=0, b=0, c=0, d=1). Therefore, for a 4×4 coding matrix, there can be up to $3\times12^{12}=12,288$ distinct markers. Using a 5×5 coding matrix, there can be up to $3 \times 2_{21} = 6,291,456$ distinct markers. Generally, using a m×n coding matrix, a black/white matrix coded visual marker system of an embodiment of the present invention can have $3 \times 2^{m \times n-4}$ markers. For some of the applications that need only a much smaller number of markers than the coding capacity, the redundant positions in the coding matrix can be used for implementation of automatic error-bit correction to improve the robustness of the marker decoding. Following the coding convention stated above, the marker shown in FIG. 5(B) is coded as 4095b (wherein the 12-bit number is 111111111111) and the marker shown in FIG. 5(C) is 1365a (e.g., 010101010101).

Figure 6:
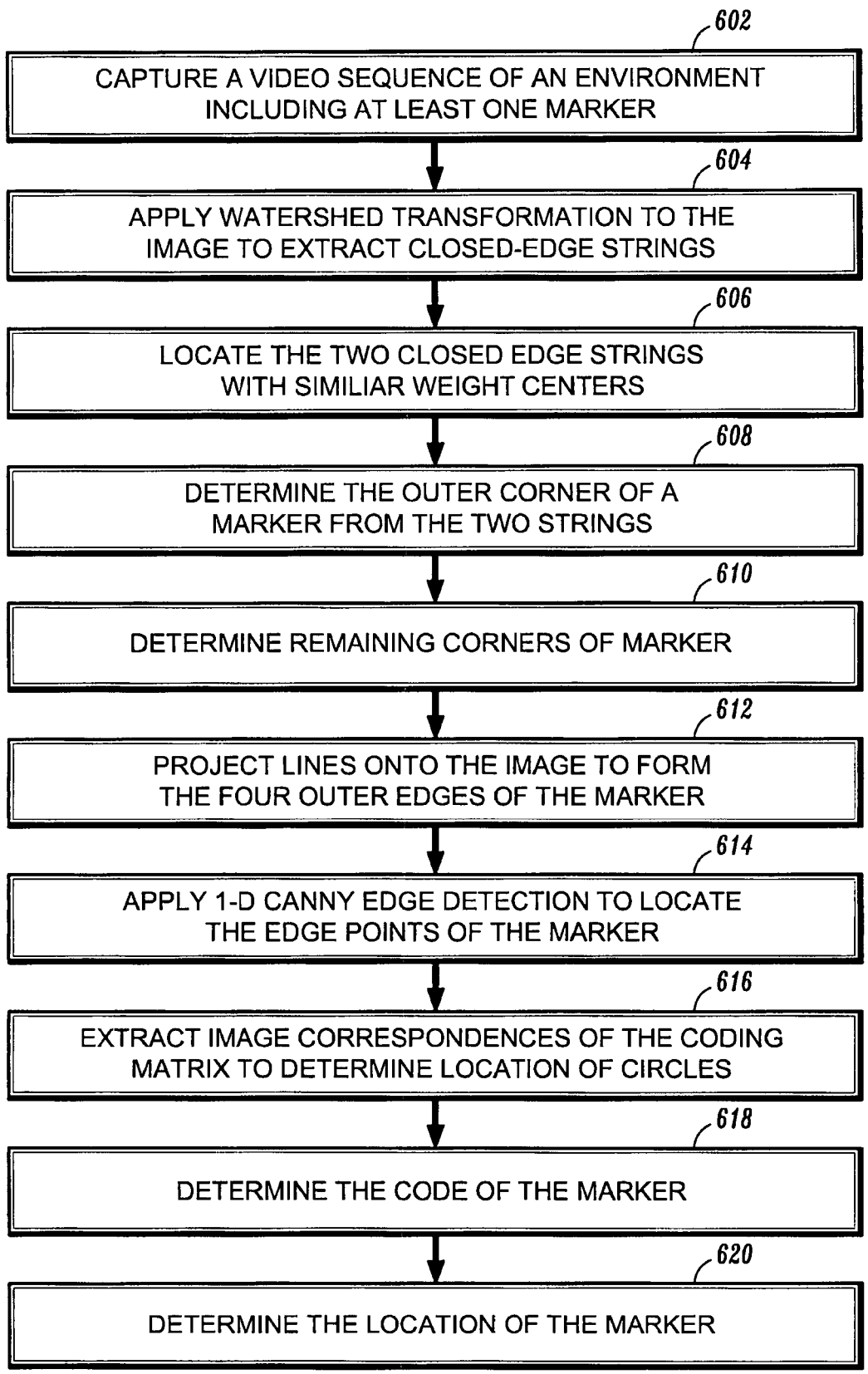
FIG. 6 is a flowchart illustrating a method for detecting and decoding the black/white matrix coded visual markers of FIG. 5.

With reference to FIG. 6, a method for detecting and decoding a matrix coded visual marker of an embodiment of the present invention will be described.

Figure 7:
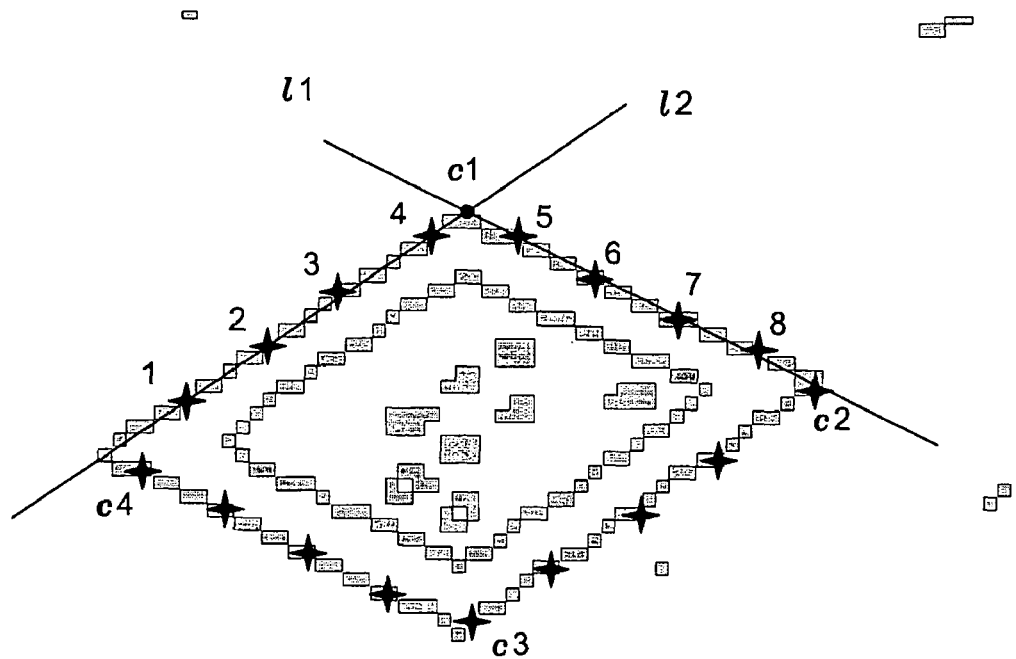
FIG. 7 is an image of a marker depicting the method used to extract a corner point of the matrix coded visual marker according to the method illustrated in FIG. 6.

Initially, a user equipped with a mobile computer having a camera coupled to the computer will enter a workspace or environment that has the black/white matrix coded markers placed throughout. A video sequence of the environment including at least one marker will be captured (step 602) to acquire an image of the marker. A watershed transformation is applied to the image to extract insulated low intensity areas and store their edges as closed-edge strings (step 604). The two closed-edge strings are found that have very close weight centers to form a contour of the marker, i.e., $d_{i,j} \leq d_{thr}$, where, $d_{i,j}$ is the distance between the weight centers of the closed-edge strings i and j, $d_{thr}$ is an adjustable threshold (step 606). An additional condition for the two closed-edge strings to be a candidate of a marker contour is if $1_i < 1_j$, then $c_{lower} 1_j \leq 1_i \leq c_{upper} 1_j$;

else $c_{lower} 1_i \leq 1_j \leq c_{upper} 1_i$ where $1_i$ and $1_j$ are the lengths (in number of edge points) of the edge strings, $c_{lower}$ and $c_{upper}$ the coefficients for the lower and upper limit of the string length. For example, when the width of the inner square is 0.65 times of the width of the outer square, $c_{lower}=0.5$ and $c_{upper}=0.8$ can be chosen. In addition, another condition check can be applied to see whether a bounding box of the shorter edge string is totally inside the bounding box of the longer edge string. FIG. 7 shows an example of such candidate edge strings.

For most conditions, there is no extreme projective distortion on the images of the markers. Therefore, the method can extract image points of the outer corners of a marker from the candidate edge strings (step 608). First, the points are sorted in the longer edge string to an order that all the edge points are sequential connected. Then, a predetermined number, e.g., twenty, of evenly distributed edge points are selected from the edge string that evenly divide the sorted edge string into segments. With no extreme projective distortion, there should be 4 to 6 selected points on each side of the marker. As for the case shown in FIG. 7, the cross point of straight lines fitted using points 1 to 4 and points 5 to 8 will be the first estimation of the image correspondence of a corner point of the marker. The other corner points can be found similarly (step 610).

Based on the corner points obtained from the previous step, the estimation of the image correspondences of the marker corner can be improved by using all the edge points of the edge string to fit the lines and find the cross points (step 612). The 1-D Canny edge detection method is then applied to find the edge of the marker (step 614) and the final correspondences of the marker corners are computed. Once the marker has been detected, the image correspondences of the circles in the coding matrix need to be identified to determine the code of the marker.

Figure 8:
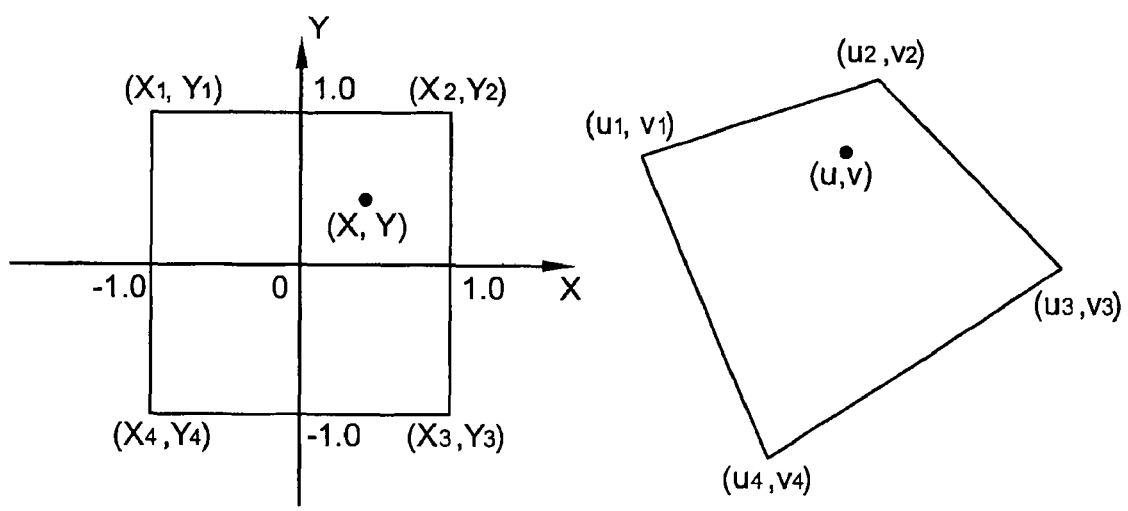
FIG. 8 is a diagram illustrating the interpolation of marker points of a black/white matrix coded visual marker in accordance with the present invention.

There are two ways to extract the image correspondences of the circles of the matrix for decoding (step 616): (1) Project the marker to the image with the first estimation of a homography obtained from the correspondences of corner points $c_1, c_2, c_3$ and $c_4$. To get accurate back projection, a non-linear optimization is needed in the estimation of the homography. (2) To avoid the non-linear optimization, an approximation of the feature points can be approximated using linear interpolation. For this purpose, the interpolation functions of the 4-node-2-dimensional linear serendipity element from finite element method, as is known in the art, can be used. Shown in FIG. 8, the approximate image correspondence (u, v) of point (X, Y) can be obtained from:

$$u(X, Y) = \sum_{i=1}^{4} (N_i(X, Y) u_i) \qquad (3)$$

$$v(X, Y) = \sum_{i=1}^{4} (N_i(X, Y) v_i)$$

where the interpolation function $N_i(X,Y)$ is expressed as $$N_i(X, Y) = \frac{1}{4}(1 + XX_i)(1 + YY_i), \qquad (4)$$

for i=1, 2, 3, and 4.

Then, the 1-D Canny edge detection is also applied to accurately locate the correspondences of the corners of the inner square.

Once the circles of the matrix of a marker is determined, the code for the marker is derived as described above (step 618), for example, 4095b as shown in FIG. 6(B). Once the code has been determined, the code can be matched against a database of codes, where the database will have information related to the code (step 620) and the pose of the marker can be determined. Additionally, the centers of the black circles can be used as additional correspondences for camera calibration. For a marker using a 4×4 coding matrix, there can be up to 23 correspondences (i.e., the marker coded 4095a).

By using the black/white matrix coded markers as described above, the marker detection and decoding is based on the image intensity only. Therefore, the detection and decoding are not affected by a color classification problem, and stable decoding results can be obtained under various environments. For the purposes of detecting markers and finding correspondences, only an 8-bit gray level image is needed, resulting in processing a smaller amount of data and achieving better system performance. Additionally, the black/white matrix coded markers provide a larger number of different coded markers, resulting increased coding flexibility.

In some applications, it's not necessary to have a large number (e.g., tens of thousands) of distinctly coded markers but the marker decoding robustness is more important. To increase the decoding robustness, error-correcting coding can be applied to the decoding of markers. For example, if using the 4×4 decoding matrix, up to 12 bits are available for marker coding. Without considering automatic error-correction, up to 12,288 different markers are available. According to the Hamming bound theorem, as is known in the art, a 12-bit binary signal can have $2^5=32$ codes with the least Hamming distance of 5 (to which a 2-bit automatic error correction can be applied). If only 1-bit automatic error correction coding is needed (the least Hamming distance is 3), up to $2^8=256$ codes with 12-bit coding is available.

For example, assume the codes '000000001001' and '000000000111' are eligible codes from a set of codes that have at least a Hamming distance of 3 between any two of eligible codes. Then, by marker detection and decoding, a resulting code r='000000000011' that is not in the set of eligible codes is obtained. There is at least 1 bit error in r. Comparing with all the eligible codes, the Hamming distance between r and the second code, '000000000111', is 1, and the Hamming distance between r and the first code, '000000001001', is 2. The Hamming distances between r and any other legal code is larger than or equal to 3. Therefore, by choosing the eligible code that has the least Hamming distance to r, the 1-bit error can be automatically corrected and the final decoding result is then set to '000000000111', which is the second code.

The marker systems of the present invention can obtain accurate (sub-pixel) correspondences of more than 4 co-planar points using one marker or a set of markers in the same plane. Since the metric information of the feature points on the markers are known, there are two cases when the information can be used to carry out camera calibration: (i) to obtain both intrinsic and extrinsic camera parameters; (ii) pose estimation, i.e., when the intrinsic camera parameters are known, to obtain the extrinsic parameters. In the first case, a homography-based calibration algorithm can be applied. For the second case, either the homography-based algorithm or a conventional 3-point algorithm can be applied. In many cases, the camera's intrinsic parameters can be obtained using Tsai's algorithm, as is known in the art, or the homography-based algorithm.

The coded visual markers of the present invention can be used in many applications, for example, for localization and data navigation. In this application, a user is equipped with a mobile computer that has (wireless) network connection with a main system, e.g. a server, so the user can access a related database. There is a camera attached to the mobile computer, for example, a SONY VAIO™ with a built-in USB camera and a built-in microphone or Xybernaut™ mobile computer with an plug-in USB camera and microphone. The system can help the user to locate their coordinates in large industrial environments and present to them information obtained from the database and the real-time systems. The user can interact with the system using keyboard, touch pad, or even voice. In this application, the markers coordinates and orientation in the global system are predetermined, the camera captures the marker and the system computes for the pose of the camera related to the captured marker, and thus obtain the position and orientation of the camera in the global system. Such localization information is then used for accessing related external databases, for example, to obtain the closest view of an on-site image with a 3-D reconstructed virtual structure overlay, or present the internal design parameters of a piece of equipment of interest. Additionally, the localization information can also be used to navigate the user through the site.

Furthermore, the coded visual markers of the present invention can be employed in Augmented Reality (AR) systems. A head mounted-display (HMD) is a key component to create an immersive AR environment for the users, i.e., an environment where virtual objects are combined with real objects. There are usually two kinds of HMDs, optical-see-through HMD and video-see-through HMD. The optical-see-through HMD directly uses a scene of the real world with the superimposition of virtual objects projected to the eye using a projector attached to eyeglasses. Since the real-world is directly captured by the eye, it usually requires the calibration of the HMD with the user's eyes to obtain good registration between the virtual objects and the real world. In addition, it also requires better motion tracking performance to reduce the discrepancies between the real and virtual world objects. The video-see-through uses a pair of cameras to capture the scenes of the real-world which is projected to the user. The superimposition of virtual objects is performed on the captured images. Therefore, only the camera needs to be calibrated for such AR processes. With the real-time detection and decoding features of the present invention, the coded markers described above are suitable for motion tracking and calibration in the HMD applications for both industrial and medical applications.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. A method for determining a pose of a user comprising the steps of:
   capturing a video image sequence of an environment including at least one coded marker, wherein the at least one coded marker comprises a coding matrix including a plurality of columns and rows with a numbered square at intersections of the columns and rows, the coding matrix being surrounded by a rectangular frame and a code of the at least one marker being determined by the numbered squares being covered by a circle;
   detecting if the at least one coded marker is present in the video images;
   extracting feature correspondences of the at least one coded marker if the at least one marker is present;
   determining a code of the at least one coded marker using the feature correspondences; and
   comparing the determined code with a database of predetermined codes to determine the pose of the user.

2. The method as in claim 1, wherein the coding matrix includes m columns and n rows, where m and n are whole number, resulting in $3\times2^{m\times n-4}$ codes.

3. The method as in claim 1, wherein the detecting step further comprises applying a watershed transformation to the at least one coded marker to extract a plurality of closed-edge strings that form a contour of the at least one marker.

4. The method as in claim 3, wherein the detecting step further comprises locating at least two closed-edge strings that have close weight centers.

5. The method as in claim 4, wherein the detecting step further comprises locating a corner of the rectangular frame of the at least one marker by determining a cross-point of the at least two closed-edge strings.

6. The method as in claim 3, wherein the detecting step comprises locating corners of the rectangular frame of the at least one marker by locating cross-points of the plurality of closed-edge strings.

7. The method as in claim 6, wherein the extracting step further comprises applying a 1-d Canny edge detection to locate the edge points of the rectangular frame.

8. The method as in claim 7, wherein the extracting step further comprises computing a homography from the corners and edge points; extracting image feature correspondences of the at least one marker; and determining locations of the circles in the coding matrix by the image correspondences.

9. The method as in claim 8, wherein the extracting image feature correspondences is performed by linear interpolation.

10. The method as in claim 8, further comprising the step of calibrating a camera used to capture the video image sequence with the image correspondences of the least one marker.

11. The method as in claim 10, further comprising the step of determining a position and orientation of the camera relative to the at least one marker.

12. A system comprising:
   a plurality of coded markers located throughout an environment, each of the plurality of coded markers relating to a location in the environment, codes of the plurality of coded markers being stored in a database, wherein a marker comprises a coding matrix including a plurality of columns and rows with a numbered square at intersections of the columns and rows, the coding matrix being surrounded by a rectangular frame and a code of a marker being determined by the numbered squares being covered by a circle;
   a camera for capturing a video image sequence of the environment;
   a processor coupled to the camera, the processor adapted for detecting if at least one coded marker is present in the video images extracting feature correspondences of the at least one coded marker if the at least one marker is present, determining a code of the at least one coded marker using the feature correspondences, and comparing the determined code with the database to determine the pose of the user.

* * * * *